(12) United States Patent
Yan et al.

(10) Patent No.: US 10,151,573 B2
(45) Date of Patent: Dec. 11, 2018

(54) DUAL-HOMODYNE LASER INTERFEROMETRIC NANOMETER DISPLACEMENT MEASURING APPARATUS AND METHOD BASED ON PHASE MODULATION

(71) Applicant: ZHEJIANG SCI-TECH UNIVERSITY, Zhejiang (CN)

(72) Inventors: Liping Yan, Zhejiang (CN); Benyong Chen, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 15/554,217

(22) PCT Filed: Jul. 22, 2016

(86) PCT No.: PCT/CN2016/090963
§ 371 (c)(1),
(2) Date: Aug. 29, 2017

(87) PCT Pub. No.: WO2018/014325
PCT Pub. Date: Jan. 25, 2018

(65) Prior Publication Data
US 2018/0328710 A1    Nov. 15, 2018

(51) Int. Cl.
*G01B 9/02* (2006.01)
(52) U.S. Cl.
CPC ....... *G01B 9/0207* (2013.01); *G01B 9/02002* (2013.01); *G01B 2290/45* (2013.01); *G01B 2290/70* (2013.01)

(58) Field of Classification Search
CPC .............. G01B 9/0207; G01B 9/02002; G01B 9/02079; G01B 9/02081; G01B 9/02001;
(Continued)

(56) References Cited

U.S. PATENT DOCUMENTS

| | | | | |
|---|---|---|---|---|
| 5,374,991 A | * | 12/1994 | Atkinson | G01F 23/292 356/493 |
| 2010/0268499 A1 | * | 10/2010 | Holzapfel | G01B 9/0207 702/76 |

OTHER PUBLICATIONS

Minoni et al A high-frequency sinusoidal phase-modulation interferometer using an electro-optic modulator: Development and evaluation, Rev. Scl. Instrum. 62 (11), Nov. 1991, American Institute of Physics (Year: 1991).*

* cited by examiner

*Primary Examiner* — Tarifur R Chowdhury
*Assistant Examiner* — Jonathon Cook
(74) *Attorney, Agent, or Firm* — JCIPRNET

(57) ABSTRACT

The present invention discloses a dual-homodyne laser interferometric nanometer displacement measuring apparatus and method based on phase modulation. The linearly polarized beam with single wavelength emitted from a single frequency laser is projected onto a dual-homodyne laser interferometer consisting of four beam splitters and two retroreflectors to respectively form a measurement interference signal and a reference interference signal received by two photodetectors, respectively; an electro-optic phase modulator is placed in the optical path and a periodic sawtooth-wave voltage signal is applied to modulate the measurement and reference DC interference signals into AC interference signals; the measured displacement is obtained by detecting the variation of the phase difference between the two interference signals caused by the movement of the measured object. The present invention overcomes the error arising from DC drift in the homodyne laser interferometer and avoids the sinusoidal error caused by the direct subdivision of the interference signal or non-quadrature error of measurement interference signal. The present invention is applicable for the precision displacement mea-
(Continued)

surement with sub-nanometer level accuracy in the fields of high-end equipment manufacturing and processing.

18 Claims, 2 Drawing Sheets

(58) Field of Classification Search
CPC ............ G01B 2290/45; G01B 2290/15; G01B 2290/70
USPC .................................................. 356/486, 493
See application file for complete search history.

(a)

(b)

DUAL-HOMODYNE LASER INTERFEROMETRIC NANOMETER DISPLACEMENT MEASURING APPARATUS AND METHOD BASED ON PHASE MODULATION

CROSS-REFERENCE TO RELATED APPLICATION

This application is a 371 of international application of PCT application serial no. PCT/CN2016/090963, filed on Jul. 22, 2016. The entirety of the above-mentioned patent application is hereby incorporated by reference herein and made a part of this specification.

FIELD OF THE INVENTION

The present invention relates to homodyne laser interferometric displacement measuring apparatus and method, particularly relates to a dual-homodyne laser interferometric nanometer displacement measuring apparatus and method based on phase modulation and belongs to the technical field of precision measurement.

DESCRIPTION OF RELATED ART

Nanometer displacement measurement with high accuracy has important applications in the ultra-precision machining, micro-electronics manufacturing, precision measurement and so on. Laser interferometry is widely used in nanometer displacement measurement because of its advantages of large measuring range, high resolution and traceability to the definition of the meter. According to the measurement principle, the laser interferometry is mainly divided into two types: homodyne interferometer and heterodyne interferometer. The homodyne interferometer is a DC type interferometer. Laser power drift, direct subdivision of interference fringes and non-quadrature interference signal will result in larger error. The heterodyne interferometer is an AC type interferometer that can overcome the influence of laser power drift. However, the improvement of measurement accuracy is limited due to the first order nonlinear error caused by frequency mixing and polarization mixing.

BRIEF SUMMARY OF THE INVENTION

In order to solve the above-mentioned disadvantages in the related art, the present invention aims to disclose a dual-homodyne laser interferometric nanometer displacement measuring apparatus and method based on phase modulation. The optical setup of two homodyne laser interferometers is constructed, and an electro-optic phase modulator is placed in the common reference arm of the two interferometers. The DC interference signals of the two homodyne laser interferometers are modulated into AC interference signals. By detecting the variation of phase difference between two interference signals, sub-nanometer displacement measurement is achieved.

The technical solutions adopted by the present invention for solving its technical problem are:

1. A dual-homodyne laser interferometric nanometer displacement measuring apparatus based on phase modulation, including a single frequency laser, a first beam splitter, a second beam splitter, a third beam splitter, a fourth beam splitter, an electro-optic phase modulator, a high voltage amplifier, a signal generator, a reference retroreflector, a measurement retroreflector, a first photodetector and a second photodetector.

The linearly polarized beam with wavelength $\lambda$ emitted from the single frequency laser is incident on the first beam splitter and divided into transmitted and reflected beams. The transmitted beam from the first beam splitter is incident on the second beam splitter and divided into transmitted and reflected beams.

The reflected beam from the second beam splitter is modulated by the electro-optic phase modulator and then projected onto the reference retroreflector. The reflected beam from the reference retroreflector is incident on the fourth beam splitter and divided into transmitted and reflected beams. The reflected beam from the fourth beam splitter and the reflected beam from the first beam splitter are merged at the third beam splitter to form the reference interference signal, which is received by the first photodetector.

The transmitted beam from the second beam splitter is projected onto the measurement retroreflector. The reflected beam from the measurement retroreflector and the transmitted beam from the fourth beam splitter are merged at the second beam splitter to form the measurement interference signal, which is received by the second photodetector.

The electro-optic phase modulator is placed between the second beam splitter and the reference retroreflector, and is used to modulate the reflected beam from the second beam splitter projected onto the reference retroreflector.

The electro-optic phase modulator is connected with the signal generator through the high voltage amplifier. The sawtooth-wave voltage output by the signal generator is amplified by the high voltage amplifier and then applied to the electro-optic phase modulator.

The electro-optic phase modulator modulates the DC interference signals of the homodyne laser interferometers into the AC interference signals.

2. A dual-homodyne laser interferometric nanometer displacement measuring method based on phase modulation:

1) The linearly polarized beam with wavelength $\lambda$ emitted from the single frequency laser is projected onto the reference and the measurement homodyne laser interferometers to form the reference and the measurement interference signals, which are respectively received by two photodetectors. The reference homodyne laser interferometer is composed of the first beam splitter, the second beam splitter, the reference retroreflector, the third beam splitter and the fourth beam splitter. The measurement homodyne laser interferometer is composed of the second beam splitter, the reference retroreflector and the measurement retroreflector.

2) The sawtooth-wave voltage output by the signal generator is amplified by the high voltage amplifier and then applied to the electro-optic phase modulator. The electro-optic phase modulator modulates the phase of the beam projected onto the reference retroreflector. The DC interference signals of the reference homodyne laser interferometer and the measurement homodyne laser interferometer are modulated into AC interference signals.

3) When the measurement retroreflector s moving, the variation of the phase difference between the measurement interference signal and the reference interference signal is measured. Then the measured displacement is given using the following equation:

$$\Delta L = \frac{\Delta \varphi}{2\pi} \times \frac{\lambda}{2}.$$

Thus, the moving displacement of the measurement retroreflector is obtained.

The present invention has the advantages that:

(1) Two sets of homodyne laser interferometers are included. Even when the measurement retroreflector keeps stationary, the DC interference signals of the two sets of homodyne laser interferometers are modulated into AC interference signals by applying periodic sawtooth-wave voltage to the electro-optic phase modulator, which overcomes the error arising from DC drift of the interference signals of homodyne laser interferometer.

(2) When the measurement retroreflector is moving, the reference interference signal acts as a signal mark to determine the variation of the phase difference between the measurement and the reference interference signals, which avoids the sinusoidal error caused by the direct subdivision of the interference signal or non-quadrature error of interference signal. And without using polarizing optics in the optical configuration, the first order nonlinear error arising from the polarization error such as non-orthogonal polarization, polarization leakage, etc. is avoided. The displacement measurement according to the present invention can achieve an accuracy up to sub-nanometer level and is about 8.8 pm.

(3) The method is simple in optical structure and convenient to use. The present invention is mainly applied to displacement measurement with sub-nanometer accuracy in such technical fields as ultra-precision fabrication, microelectronics manufacturing, precision metrology and so on.

DETAILED DESCRIPTION OF THE INVENTION

The present invention is further described in details hereinafter with the Figures and Embodiments.

Figure 1:
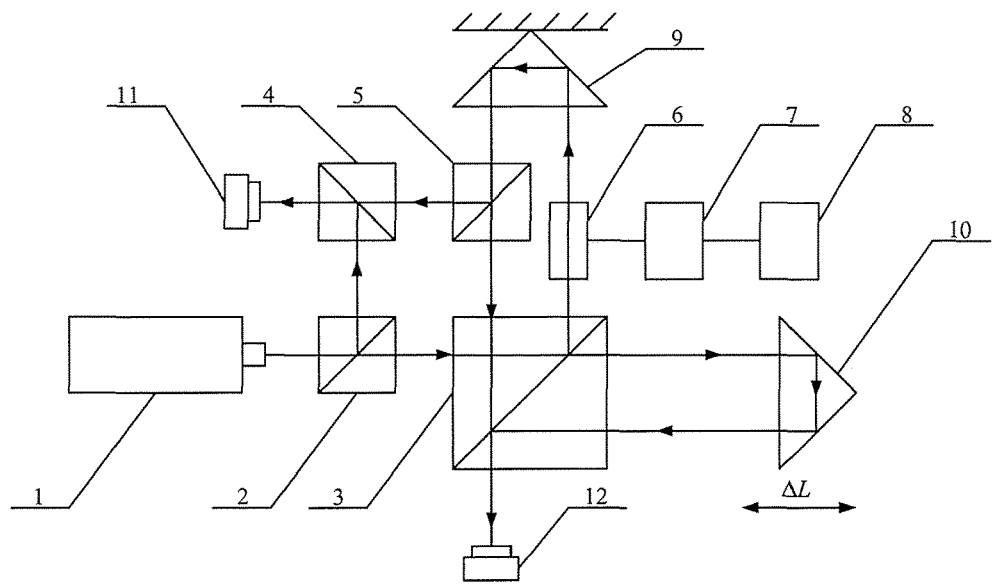
FIG. 1 is the schematic diagram of the present invention.

As shown in FIG. 1, the apparatus of the present invention comprises a single frequency laser 1, a first beam splitter 2, a second beam splitter 3, a third beam splitter 4, a fourth beam splitter 5, an electro-optic phase modulator 6, a high voltage amplifier 7, a signal generator 8, a reference retroreflector 9, a measurement retroreflector 10, a first photodetector 11 and a second photodetector 12. The linearly polarized beam with wavelength $\lambda$ emitted from the single frequency laser 1 is projected onto the first beam splitter 2. The transmitted beam from the first beam splitter 2 is projected onto the second beam splitter 3. The reflected beam from the second beam splitter 3 is modulated by the electro-optic phase modulator 6 and then projected onto the reference retroreflector 9. The reflected beam from the reference retroreflector 9 is projected onto the fourth beam splitter 5. The reflected beam from the fourth beam splitter 5 and the reflected beam from the first beam splitter 2 are merged at the third beam splitter 4 to form the reference interference signal received by the first photodetector 11. The transmitted beam from the second beam splitter 3 is projected onto the measurement retroreflector 10. The reflected beam from the measurement retroreflector 10 and the transmitted beam from the fourth beam splitter 5 are merged at the second beam splitter 3 to form the measurement interference signal received by the second photodetector 12.

The sawtooth-wave voltage output by the signal generator 8 is amplified by the high voltage amplifier 7 and then applied to the electro-optic phase modulator 6. The electro-optic phase modulator 6 is placed between the second beam splitter 3 and the reference retroreflector 9. The polarization direction of the linearly polarized beam emitted from the single frequency laser 1 coincides with the direction of electric field applied to the electro-optic phase modulator 6.

The specific implementation for the present invention includes the following steps:

Denoting the interferometer composed of the first beam splitter 2, the second beam splitter 3, the reference retroreflector 9, the third beam splitter 4 and the fourth beam splitter 5 as the reference homodyne laser interferometer, denoting the interferometer composed of the second beam splitter 3, the reference retroreflector 9 and the measurement retroreflector 10 as the measurement homodyne laser interferometer, and denoting $L_r$ and $L_m$ as the initial optical path differences between the two arms of the reference interferometer and the measurement interferometer, respectively, the phases of the reference interference signal and the measurement interference signal received by the two photodetectors before modulation are respectively shown as follows:

$$\varphi_{r0} = \frac{2\pi L_r}{\lambda} \quad (1)$$

$$\varphi_{m0} = \frac{2\pi L_m}{\lambda} \quad (2)$$

where $\varphi_{r0}$ and $\varphi_{m0}$ are the phases of the reference and the measurement interference signals, respectively; $\lambda$ is the laser wavelength.

When the voltage $V_s(t)$ is applied to the electro-optic phase modulator 6, the phases of the two interference signals are respectively shown as follows:

$$\varphi_r = \frac{2\pi L_r}{\lambda} - \frac{\pi}{\lambda} n_e^3 r_{33} \frac{L}{d} V_s(t) \quad (3)$$

$$\varphi_m = \frac{2\pi L_m}{\lambda} - \frac{\pi}{\lambda} n_e^3 r_{33} \frac{L}{d} V_s(t) \quad (4)$$

where $n_e$ is the refractive index of the electro-optic crystal in the optical axis direction; $r_{33}$ is the linear electro-optic coefficient; L is the length of the electro-optic crystal along the beam propagation direction; d is the distance between the electrodes of the electro-optic crystal.

Figure 2:
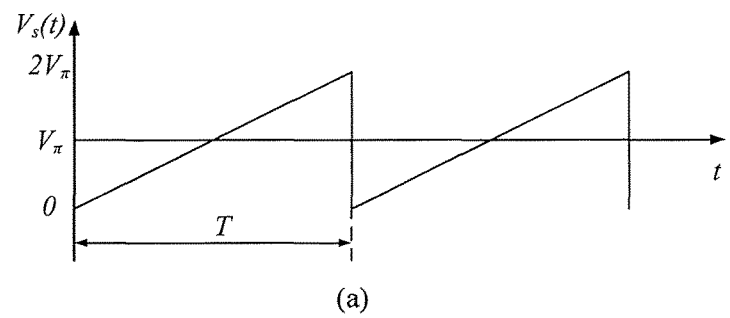
FIG. 2 is the schematic diagram of the modulation voltage waveform (a) and the two interference signals after modulation (b).
Figure 2:
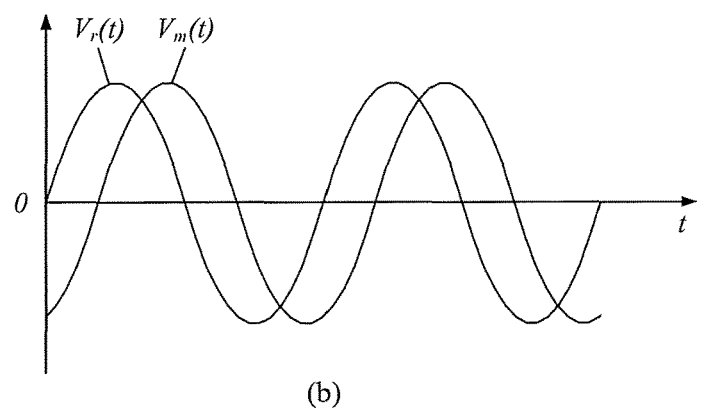

In Eq. (3) and Eq. (4), when the periodic sawtooth-wave modulation voltage is applied to the electro-optic crystal, the relationship between the phase change of the measurement and the reference interference signals and the modulation voltage $V_s(t)$ is shown in FIG. 2. Here, $$V_s(t) = 2V_\pi \left( \frac{t}{T} - \left[ \frac{t}{T} \right] \right)$$

is the sawtooth-wave voltage applied to the electro-optic phase modulator 6 with period of T (wherein [ ] means rounded down, and $$V_\pi = \frac{\lambda}{n_e^3 r_{33}}\left(\frac{d}{L}\right)$$

is the voltage required to produce a phase shift of π radians and is also called half-wave voltage). $V_r(t)$ is the waveform of reference interference signal, and $V_m(t)$ is the waveform of measurement interference signal.

As it can be seen from FIG. 2, the reference interference signal and measurement interference signal are modulated into AC signals. According to Eq. (3) and Eq. (4), the initial phase difference between the two interference signals is expressed as:

$$\Delta\varphi_1 = \varphi_m - \varphi_r = \frac{2\pi \cdot (L_m - L_r)}{\lambda} \quad (5)$$

When the measurement retroreflector 10 is moved a displacement ΔL, the phase of the measurement interference signal is changed to:

$$\varphi'_m = 2\pi\frac{L_m + 2\cdot\Delta L}{\lambda} - \frac{\pi}{\lambda}n_e^3 r_{33}\frac{L}{d}V_s(t) \quad (6)$$

And the phase difference between the two interference signals is changed as follows:

$$\Delta\varphi_2 = \varphi'_m - \varphi_r = 2\pi\frac{L_m - L_r + 2\cdot\Delta L}{\lambda} \quad (7)$$

Figure 3:
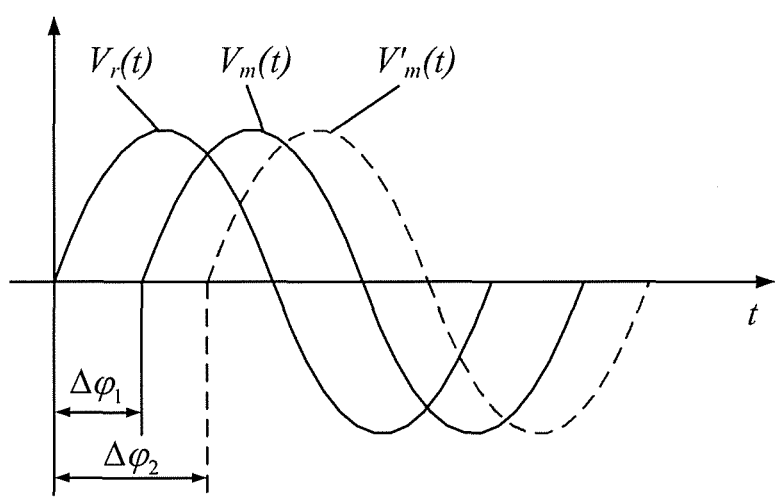
FIG. 3 is the schematic diagram showing the variation of the phase difference between the measurement interference signal and the reference interference signal.

The change of the phase difference between the two interference signals is shown in FIG. 3. $V_m'(t)$ is the waveform of measurement interference signal after the movement of the measurement retroreflector 10.

By subtracting Eq. (5) from Eq. (7), the following equation is obtained:

$$\Delta\varphi_2 - \Delta\varphi_1 = 2\pi\frac{2\cdot\Delta L}{\lambda} \quad (8)$$

Denoting Δφ=Δφ₂−Δφ₁, then according to Eq. (8), the moving displacement ΔL of the measurement retroreflector 10 is obtained by:

$$\Delta L = \frac{\Delta\varphi}{2\pi} \times \frac{\lambda}{2} \quad (9)$$

In the embodiment of the present invention, the laser source is the single frequency He—Ne stabilized laser with the model of XL80 made by Renishaw Company from England, which emits a linearly polarized beam. And the laser wavelength is typically 632.99057 nm. The measurement accuracy of the phase difference between the interference signals is generally 0.01 at current art. Thereby, by substituting these typical values into Eq. (9), the displacement measurement accuracy can be up to 8.8 pm.

From the above description, in the present invention, without using polarizing optics in the optical configuration, the first-order nonlinear error arising from the polarization error such as non-orthogonal polarization, polarization leakage, etc. can be avoided and the sub-nanometer displacement measurement accuracy has realized. The present invention also overcomes the error arising from DC drift of the interference signals of homodyne laser interferometer and has the advantages of high measurement accuracy and remarkable technical effects.

The above embodiment is intended to explain the present invention, but not to limit the present invention. Any modification and change made to the present invention within the protection scope of the spirit and the Claims of the present invention fall in the protection scope of the present invention.

What is claimed is:

1. A dual-homodyne laser interferometric nanometer displacement measuring apparatus based on phase modulation, comprising: a single frequency laser, a first beam splitter, a second beam splitter, a third beam splitter, a fourth beam splitter, an electro-optic phase modulator, a high voltage amplifier, a signal generator, a reference retroreflector, a measurement retroreflector, a first photodetector and a second photodetector, wherein a linearly polarized beam is emitted from the single frequency laser and incident on the first beam splitter, the linearly polarized beam is divided into a transmitted beam and a reflected beam by the first beam splitter, wherein the transmitted beam from the first beam splitter is incident on the second beam splitter and divided into a transmitted beam and a reflected beam by the second beam splitter, wherein the reflected beam from the second beam splitter is modulated by the electro-optic phase modulator and then projected onto the reference retroreflector, and a reflected beam from the reference retroreflector is incident on the fourth beam splitter and divided into a transmitted beam and a reflected beam by the fourth beam splitter, wherein the reflected beam from the fourth beam splitter and the reflected beam from the first beam splitter are merged at the third beam splitter to form a reference interference signal and the reference interference signal is received by the first photodetector, wherein the transmitted beam from the second beam splitter is projected onto the measurement retroreflector, and a reflected beam from the measurement retroreflector and the transmitted beam from the fourth beam splitter are merged at the second beam splitter to form a measurement interference signal, and the measurement interference signal is received by the second photodetector.

2. The dual-homodyne laser interferometric nanometer displacement measuring apparatus based on phase modulation according to claim 1, wherein the electro-optic phase modulator is placed between the second beam splitter and the reference retroreflector, and is configured to modulate the reflected beam from the second beam splitter projected onto the reference retroreflector.

3. The dual-homodyne laser interferometric nanometer displacement measuring apparatus based on phase modulation according to claim 2, wherein the electro-optic phase modulator modulates a DC interference signal of a homodyne laser interferometer to an AC interference signal.

4. The dual-homodyne laser interferometric nanometer displacement measuring apparatus based on phase modulation according to claim 1, wherein the electro-optic phase modulator is connected to the signal generator through the high voltage amplifier, a sawtooth-wave voltage output by the signal generator is amplified by the high voltage amplifier and then applied to the electro-optic phase modulator.

5. The dual-homodyne laser interferometric nanometer displacement measuring apparatus based on phase modulation according to claim 4, wherein the electro-optic phase modulator modulates a DC interference signal of a homodyne laser interferometer to an AC interference signal.

6. The dual-homodyne laser interferometric nanometer displacement measuring apparatus based on phase modulation according to claim 1, wherein the electro-optic phase modulator modulates a DC interference signal of a homodyne laser interferometer to an AC interference signal.

7. A dual-homodyne laser interferometric nanometer displacement measuring method based on phase modulation, applicable to an apparatus comprising a single frequency laser, a first beam splitter, a second beam splitter, a third beam splitter, a fourth beam splitter, an electro-optic phase modulator, a high voltage amplifier, a signal generator, a reference retroreflector, a measurement retroreflector, a first photodetector and a second photodetector, the method comprising:
 1) emitting a linearly polarized beam by the single frequency laser so that the linearly polarized beam is projected onto a reference homodyne laser interferometer and a measurement homodyne laser interferometer to form a reference interference signal and a measurement interference signal, and the reference interference signal and the measurement interference signal are respectively received by the first photodetector and the second photodetector, wherein the reference homodyne laser interferometer comprises the first beam splitter, the second beam splitter, the reference retroreflector, the third beam splitter and the fourth beam splitter, wherein the measurement homodyne laser interferometer comprises the second beam splitter, the reference retroreflector and the measurement retroreflector;
 2) outputting a sawtooth-wave voltage by the signal generator, amplifying the sawtooth-wave voltage by the high voltage amplifier, and then applying the amplified sawtooth-wave voltage to the electro-optic phase modulator, wherein the electro-optic phase modulator modulates a phase of a beam projected onto the reference retroreflector, wherein DC interference signals of the reference homodyne laser interferometer and the measurement homodyne laser interferometer are modulated into AC interference signals; and
 3) calculating a measured displacement of the measurement retroreflector according to the reference interference signal and the measurement interference signal received by the first photodetector and the second photodetector when the measurement retroreflector is moving,
 wherein the linearly polarized beam is emitted from the single frequency laser and incident on the first beam splitter, the linearly polarized beam is divided into a transmitted beam and a reflected beam by the first beam splitter, wherein the transmitted beam from the first beam splitter is incident on the second beam splitter and divided into a transmission beam and a reflected beam by the second beam splitter,
 wherein the reflected beam from the second beam splitter is modulated by the electro-optic phase modulator and projected onto the reference retroreflector, and a reflected beam from the reference retroreflector is incident on the fourth beam splitter and divided into a transmitted beam and a reflected beam by the fourth beam splitter, wherein the reflected beam from the fourth beam splitter and the reflected beam from the first beam splitter are merged at the third beam splitter to form the reference interference signal and the reference interference signal is received by the first photodetector,
 wherein the transmitted beam from the second beam splitter is projected onto the measurement retroreflector, and a reflected beam from the measurement retroreflector and the transmitted beam from the fourth beam splitter are merged at the second beam splitter to form the measurement interference signal, and the measurement interference signal is received by the second photodetector.

8. The dual-homodyne laser interferometric nanometer displacement measuring method based on phase modulation according to claim 7, wherein the electro-optic phase modulator is placed between the second beam splitter and the reference retroreflector, and is configured to modulate the reflected beam from the second beam splitter projected onto the reference retroreflector.

9. The dual-homodyne laser interferometric nanometer displacement measuring method based on phase modulation according to claim 8, wherein the electro-optic phase modulator modulates DC interference signals of the reference homodyne laser interferometer and the measurement homodyne laser interferometer to AC interference signals.

10. The dual-homodyne laser interferometric nanometer displacement measuring method based on phase modulation according to claim 9, wherein the step of calculating the measured displacement according to the reference interference signal and the measurement interference signal received by the first photodetector and the second photodetector when the measurement retroreflector is moving comprises:
 measuring a variation of a phase difference between the measurement interference signal and the reference interference signal, and calculating the measured displacement as the moving displacement of the measurement retroreflector using the following equation:

$$\Delta L = \frac{\Delta \varphi}{2\pi} \times \frac{\lambda}{2},$$

wherein $\Delta \varphi$ is the variation of the phase difference between the measurement interference signal and the reference interference signal, $\lambda$ is a wavelength of linearly polarized beam emitted from the single frequency laser, and $\Delta L$ is the measured displacement.

11. The dual-homodyne laser interferometric nanometer displacement measuring method based on phase modulation according to claim 8, wherein the step of calculating the measured displacement according to the reference interference signal and the measurement interference signal received by the first photodetector and the second photodetector when the measurement retroreflector is moving comprises:
 measuring a variation of a phase difference between the measurement interference signal and the reference interference signal, and calculating the measured displacement as the moving displacement of the measurement retroreflector using the following equation:

$$\Delta L = \frac{\Delta \varphi}{2\pi} \times \frac{\lambda}{2},$$

wherein $\Delta \varphi$ is the variation of the phase difference between the measurement interference signal and the reference interference signal, $\lambda$ is a wavelength of linearly polarized beam emitted from the single frequency laser, and $\Delta L$ is the measured displacement.

12. The dual-homodyne laser interferometric nanometer displacement measuring method based on phase modulation according to claim 7, wherein the electro-optic phase modulator is connected to the signal generator through the high voltage amplifier.

13. The dual-homodyne laser interferometric nanometer displacement measuring method based on phase modulation according to claim 12, wherein the electro-optic phase modulator modulates DC interference signals of the reference homodyne laser interferometer and the measurement homodyne laser interferometer to AC interference signals.

14. The dual-homodyne laser interferometric nanometer displacement measuring method based on phase modulation according to claim 13, wherein the step of calculating the measured displacement according to the reference interference signal and the measurement interference signal received by the first photodetector and the second photodetector when the measurement retroreflector is moving comprises:
measuring a variation of a phase difference between the measurement interference signal and the reference interference signal, and calculating the measured displacement as the moving displacement of the measurement retroreflector using the following equation:

$$\Delta L = \frac{\Delta \varphi}{2\pi} \times \frac{\lambda}{2},$$

wherein $\Delta \varphi$ is the variation of the phase difference between the measurement interference signal and the reference interference signal, $\lambda$ is a wavelength of linearly polarized beam emitted from the single frequency laser, and $\Delta L$ is the measured displacement.

15. The dual-homodyne laser interferometric nanometer displacement measuring method based on phase modulation according to claim 12, wherein the step of calculating the measured displacement according to the reference interference signal and the measurement interference signal received by the first photodetector and the second photodetector when the measurement retroreflector is moving comprises:
measuring a variation of a phase difference between the measurement interference signal and the reference interference signal, and calculating the measured displacement as the moving displacement of the measurement retroreflector using the following equation:

$$\Delta L = \frac{\Delta \varphi}{2\pi} \times \frac{\lambda}{2},$$

wherein $\Delta \varphi$ is the variation of the phase difference between the measurement interference signal and the reference interference signal, $\lambda$ is a wavelength of linearly polarized beam emitted from the single frequency laser, and $\Delta L$ is the measured displacement.

16. The dual-homodyne laser interferometric nanometer displacement measuring method based on phase modulation according to claim 7, wherein the electro-optic phase modulator modulates DC interference signals of the reference homodyne laser interferometer and the measurement homodyne laser interferometer to AC interference signals.

17. The dual-homodyne laser interferometric nanometer displacement measuring method based on phase modulation according to claim 16, wherein the step of calculating the measured displacement according to the reference interference signal and the measurement interference signal received by the first photodetector and the second photodetector when the measurement retroreflector is moving comprises:
measuring a variation of a phase difference between the measurement interference signal and the reference interference signal, and calculating the measured displacement as the moving displacement of the measurement retroreflector using the following equation:

$$\Delta L = \frac{\Delta \varphi}{2\pi} \times \frac{\lambda}{2},$$

wherein $\Delta \varphi$ is the variation of the phase difference between the measurement interference signal and the reference interference signal, $\lambda$ is a wavelength of linearly polarized beam emitted from the single frequency laser, and $\Delta L$ is the measured displacement.

18. The dual-homodyne laser interferometric nanometer displacement measuring method based on phase modulation according to claim 7, wherein the step of calculating the measured displacement according to the reference interference signal and the measurement interference signal received by the first photodetector and the second photodetector when the measurement retroreflector is moving comprises:
measuring a variation of a phase difference between the measurement interference signal and the reference interference signal, and calculating the measured displacement as the moving displacement of the measurement retroreflector using the following equation:

$$\Delta L = \frac{\Delta \varphi}{2\pi} \times \frac{\lambda}{2},$$

wherein $\Delta \varphi$ is the variation of the phase difference between the measurement interference signal and the reference interference signal, $\lambda$ is a wavelength of linearly polarized beam emitted from the single frequency laser, and $\Delta L$ is the measured displacement.

* * * * *